J. L. JOYCE.

Manufacture of Boots and Shoes.

No. 6,480. Reissued June 8, 1875.

Witnesses.
H. Shumway
Clara Broughton

Joyce Protection Toe Association
assignees of
Jos. L. Joyce
By atty. Inventor
Wm. E. Earle

THE GRAPHIC CO. PHOTO-LITH. 39 & 41 PARK PLACE, N.Y.

UNITED STATES PATENT OFFICE.

JOSEPH L. JOYCE, OF NEW HAVEN, CONNECTICUT, ASSIGNOR TO THE JOYCE PROTECTION-TOE ASSOCIATION, OF SAME PLACE.

IMPROVEMENT IN THE MANUFACTURE OF BOOTS AND SHOES.

Specification forming part of Letters Patent No. 141,357, dated July 29, 1873; reissue No. 6,480, dated June 8, 1875; application filed May 4, 1875.

*To all whom it may concern:*

Be it known that I, JOSEPH L. JOYCE, of New Haven, in the county of New Haven and State of Connecticut, have invented a new Improvement in Boots and Shoes; and I do hereby declare the following, when taken in connection with the accompanying drawings and the letters of reference marked thereon, to be a full, clear, and exact description of the same, and which said drawings constitute part of this specification, and represent, in—

Figure 1:
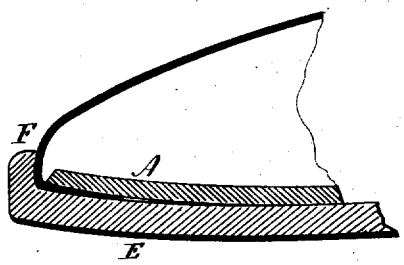
Figure 2:
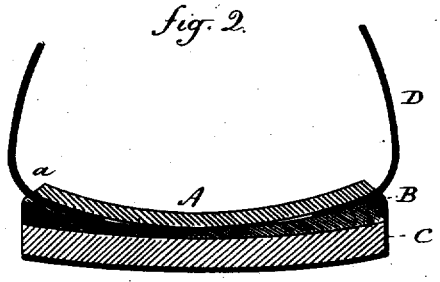

Figure 1 a longitudinal section of the toe end of a shoe; Fig. 2, a transverse section of a shoe, illustrating the usual construction and my improvement.

This invention relates to an improvement in the manufacture of boots and shoes, the object being to protect the upper leather in the vicinity of the sole.

In the usual construction of boots and shoes, the upper leather as it is turned up over the edge of the insole is exposed upon the inside to the angle of the upper side of the insole and at the toe of the shoe, particularly in children's wear. This soon cuts through the leather, or rather forms a bearing, against which the wear upon the outside soon takes away the upper. While this is more apparent at the toe, this peculiar wear occurs around the ball of the shoe.

The object of this invention is to overcome this difficulty; and it consists in beveling the edge of the insole from the lower side back toward the top, so that the upper will not bear against the upper angle of the insole; also in an upwardly-projecting edge on the sole around the toe formed from a part of the sole, but so as to preserve the outer edge of the sole, to show as the whole or part of the principal sole, as more fully hereinafter described.

Upon the right side of Fig. 2 I illustrate the usual construction.

A is the insole; B, the second sole; and C the outsole. As there represented, it will be served that the upper leather D draws up over the edge of the insole, and is at that point exposed to wear.

In my improved construction I bevel the insole back from the lower surface up, as denoted at *a* on the left of Fig. 2, so that the angle of the insole, around which the upper bears, will be down upon the outer sole—that is to say, there is no exposed angle in the upper against which the wear will come as in the usual construction. This advantage is more apparent at the toe, as seen in Fig. 1.

By this construction, the angle against which the wear of the shoe is made being removed, it follows that the wear of the shoe will be much less than when the angle is present, as in the usual construction.

The second part of my invention is illustrated in Fig. 1. The sole E is constructed with an edge, F, projecting up onto and so as to protect the upper. This edge is here represented as formed by cutting down the surface, it only being essential that it be formed as a part of the sole.

I claim as my invention—

1. In the manufacture of boots and shoes, the insole beveled from the lower side back toward the top and from the upper, or so as to form a space between the edge of the insole and the upper, substantially as and for the purpose specified.

2. In the manufacture of boots and shoes from leather, the sole constructed with a recess, into which the insole and the upper at the edge of the insole are embedded, the surrounding edge of said recess formed from the sole itself, within and so as to preserve the outer edge of the said sole, to show as the whole or part of the principal or outer sole, substantially as described.

Witnesses: JOS. L. JOYCE.

JOHN E. EARLE.

JNO. D. PATTEN.